(12) United States Patent
Levine

(10) Patent No.: US 6,385,590 B1
(45) Date of Patent: May 7, 2002

(54) METHOD AND SYSTEM FOR DETERMINING THE EFFECTIVENESS OF A STIMULUS

(76) Inventor: Philip Levine, 1234 S. Congress Ave., Delray Beach, FL (US) 33445

( * ) Notice: Subject to any disclaimer, the term of this patent is extended or adjusted under 35 U.S.C. 154(b) by 0 days.

(21) Appl. No.: 09/717,096

(22) Filed: Nov. 22, 2000

(51) Int. Cl.[7] .................................................. G06F 17/60
(52) U.S. Cl. ............................................ 705/10; 705/7
(58) Field of Search ................................ 705/10, 14, 7; 709/224; 434/322; 600/544

(56) References Cited

U.S. PATENT DOCUMENTS

| | | |
|---|---|---|
| 4,483,681 A | 11/1984 | Weinblatt ................. 434/236 |
| 4,755,045 A | 7/1988 | Borah et al. ............... 351/210 |
| 5,227,874 A | 7/1993 | Von Kohorn ............... 358/84 |
| 5,243,517 A | 9/1993 | Schmidt et al. ........... 364/419.2 |
| 5,870,559 A | 2/1999 | Leshem et al. ......... 395/200.54 |
| 5,878,384 A | 3/1999 | Johnson et al. ............ 702/187 |
| 5,911,581 A * | 6/1999 | Reynolds et al. ........... 434/236 |
| 5,945,991 A * | 8/1999 | Britt et al. .................. 345/333 |
| 5,951,642 A | 9/1999 | Onoe et al. ................. 709/224 |
| 5,968,125 A | 10/1999 | Garrick et al. ............. 709/224 |
| 6,006,197 A | 12/1999 | d'Eon et al. ................. 705/10 |
| 6,008,807 A * | 12/1999 | Bretschneider et al. ..... 345/339 |
| 6,070,145 A * | 5/2000 | Pinsley et al. ............... 705/10 |
| 6,144,991 A * | 11/2000 | England ...................... 709/205 |
| 6,228,038 B1 * | 5/2001 | Claessens ................... 600/558 |
| 6,260,064 B1 * | 7/2001 | Kurzrok ...................... 709/224 |
| 6,275,854 B1 * | 8/2001 | Himmel et al. ............. 709/224 |
| 6,286,005 B1 * | 9/2001 | Cannon ....................... 707/100 |

FOREIGN PATENT DOCUMENTS

| | | | | |
|---|---|---|---|---|
| WO | WO 98/52310 | * | 11/1998 | ............ H04H/9/00 |
| WO | WO 200133466 A1 | * | 5/2001 | ............ G06F/17/60 |

OTHER PUBLICATIONS

Hoffman et al., "Marketing in hypermedia computer–mediated environments: Conceptual foundations," Journal of Marketing, Jul. 1996, vol. 60, No. 3, pp. 50–68.*
"Microsoft Press Computer Dictionary," Microsoft Press 1997, p. 92.*
Lubnik, "Peer Review: My Eyeballs are Bigger than Your Eyeballs," Marketing Computers, Jan. 2000, vol. 20, No. 1, 3 pages.*
Briggs et al., "Advertising on the Web: Is there response before click–through?" Journal of Advertising Research, Mar./Apr. 1997 vol. 37, No. 2, 13 pages.*
Lohse, "Consumer eye movement patterns on yellow pages advertising," Journal of Advertising, Spring 1997, 11 pages.*
"Neoglyphics Media Corporation Announces Dynamically Driven Web Site," PR Newswire, Dec. 7, 1995, 2 pages.*
http://education.indiana.edu/ist/faculty/iuwebrep.html, pp. 1 to 10, Sep. 20, 2000.

(List continued on next page.)

Primary Examiner—Tariq R. Hafiz
Assistant Examiner—Marc Norman
(74) Attorney, Agent, or Firm—Banner & Witcoff, Ltd.

(57) ABSTRACT

The present invention is a method and system of analyzing a stimulus using a computer network such as the Internet. The invention can be used to more effectively analyze any stimulus that may be presented via a personal computer connected to the network by asking a participant attitudinal and/or behavioral questions regarding a stimulus while monitoring the participant's behavior when interacting with the stimulus, and more specifically monitoring which portions of the stimulus the respondent views and for how long, asking a set of attitudinal and/or behavioral questions regarding the participant's reaction to the stimulus, statistically analyzing the data collected to determine an effectiveness coefficient to the stimulus as an indication of its effectiveness.

26 Claims, 14 Drawing Sheets

OTHER PUBLICATIONS http://trochim.human.cornell.edu/webeval/webexper/webexper.htm.
http://www.nfoi.com/nfointeractive/Default.asp.
http://www.markettools.com/flash.htm.
web page located at http://www.greenfieldonline.com/.
http://www.greenfieldonline.com/memberservices/faq.htm.
http://www.activeresearch.com/products/products.html.
http://www.harrisinteractive.com/surveytempbottom.asp.
http://www.harrisinteractive.com/indexcontenttemp.asp.
http://www.informative.com/about/index_body.html.
http://www.informative.com/about/index_header.html.
http://www.knowledgenetworks.com/index2.html.
http://www.millwardbrown.com/index2.asp.
http://www.npd.com/corp/blueback.htm.
http://www.npd.com/corp/npdhome.htm.
http:www.npd.com/corp/np_hleft.htm.
http://www.npd.com/corp/navbars/topbar_b.htm.
http://www.npd.com/corp/navbars/topbar_t.htm.
web page located at http://www.yankelovich.com/.
http://www.quicktake.com/qt/default.asp.
web page located at http://www.zoomerang.com/.
web page located at http://www.netvotes.com/.
http://www.askget.com/home.cfm.
http://ww.askget.com/top.html.
web page located at http://ww.poll4all.com/.
web page located at http://www.pollit.com/.
web page located at http://www.sawtooth.com/.
web page located at http://www.acnielsen.com/.
http://us.mediametrix.com/home.isp.
http://www.nielsenmedia.com/main.html.
http://www.nielsenmedia.com/header.html.
http://www.nielsenmedia.com/toc.html.
web page located at http://www.cyberdialogue.com/.
web page located at http://www.findsvp.com/.
web page located at http://www.gartnergroup.com/.
http://www.forrester.com/Home/0,3257,1,FF.html.
http://www.jupitercommunications.com/home.jsp.
web page located at http://websitegarage.netscape.com.
web page located at http://stylusinc.com.
http://www.indiana.edu/~iirg/ARTICLES/usability/usability.main.html.

* cited by examiner

1. Have you ever visited any of the following websites?

|  | Yes | No |
|---|---|---|
| Website 1 | – | – |
| Website 2 | – | – |
| Website 3 | – | – |

2. How often have you visited each of the following websites?

|  | Daily | 4-6 times/wk | 2-3 times /wk | Weekly | Twice a month | Once a month | Less than once a month | Never |
|---|---|---|---|---|---|---|---|---|
| Website 1 | – | – | – | – | – | – | – | – |
| Website 2 | – | – | – | – | – | – | – | – |
| Website 3 | – | – | – | – | – | – | – | – |

3. How did you initially locate these websites?

|  | Word of Mouth | Surfing the Web | Banners/ Advertising | Other Advertising | Search Engine/ Directory | Other | Never Located |
|---|---|---|---|---|---|---|---|
| Website 1 | – | – | – | – | – | – | – |
| Website 2 | – | – | – | – | – | – | – |
| Website 3 | – | – | – | – | – | – | – |

FIG. 5A

1. From which of these websites would you most likely purchase products and/or services?

Website 1 _
    Website 2 _
    Website 3 _

2. Which of these websites would you most likely re-visit?

Website 1 _
    Website 2 _
    Website 3 _

3. Which of these websites offer products/services that are most affordable?

Website 1 _
    Website 2 _
    Website 3 _

4. Which of these websites offer products/services that provide a good value?

Website 1 _
    Website 2 _
    Website 3 _
    None _

5. Which of these websites offer products/services which are most effective in achieving [a stated goal, e.g. "weight loss" for a diet-related website]?

Website 1 _
    Website 2 _
    Website 3 _

6. Which of these websites would be most effective in helping you adopt a healthy lifestyle?

Website 1 _
    Website 2 _
    Website 3 _

7. Please rate how likely you would be to purchase a product/service from each of these websites:

| | Definitely Will Purchase | Probably Will Purchase | May/May Not Purchase | Probably Will Not Purchase | Definitely Will Not Purchase |
|---|---|---|---|---|---|
| Website 1 | _ | _ | _ | _ | _ |
| Website 2 | _ | _ | _ | _ | _ |
| Website 3 | _ | _ | _ | _ | _ |

FIG. 5B

Please read the following statements regarding the xyzcorp.com website's interactivity and then tell us whether you agree strongly, agree somewhat, neither agree or disagree, disagree somewhat, or disagree strongly with each statement.

The xyzcorp.com website...

|  | Agree Strongly | Agree Somewhat | Neither Agree nor Disagree | Disagree Somewhat | Disagree Strongly |
|---|---|---|---|---|---|
| ...has enough links/connections to related websites. | – | – | – | – | – |
| ...has enough links/connections to other things you want to see and/or use. | – | – | – | – | – |
| ...allows you to be interactive when you want to be. | – | – | – | – | – |
| ...has website components that work the way they are supposed to. | – | – | – | – | – |
| ...has pages that were too slow when downloading. | – | – | – | – | – |
| ...can be counted on to work properly at all times. | – | – | – | – | – |
| ...has a response speed that meets my needs. | – | – | – | – | – |
| ...is a website I would use frequently. | – | – | – | – | – |
| ...has individual pages that were poorly designed. | – | – | – | – | – |

1. Which of the following describes your age?

Under 21 —
   21-49 —
   50 and over —

2. Which of the following describes your current work status?

Full-time —
   Part-time —
   Student —
   Other —

3. Which of the following describes your education?

Some high school or less —
   Completed high school —
   Some college —
   College-Associates Degree —
   College-Bachelors Degree —
   Some Graduate School —
   Completed Graduate School —

4. Which of the following best describes your current household income?

Under $25,000 —
   $25,000-$39,999 —
   $40,000-$59,999 —
   $60,000-$99,999 —
   $100,000-$149,999 —
   $150,000+ —

5. Are you Male or Female?

Male —
   Female —

FIG. 5D

1. Which of the following websites do you remember visiting yesterday?

Website 1 —
   Yahoo.com —
   Website 2 —
   Amazon.com —
   Website 3 —
   EBay.com —

2. Which of the following websites would you purchase products/services from?

Website 1 —
   Website 2 —
   Website 3 —

3. Which of these websites would you re-visit?

Website 1 —
   Website 2 —
   Website 3 —

4. Which of the following websites do you think needs significant improvement?

Website 1 —
   Website 2 —
   Website 3 —

5. What types of improvement do the following websites require?

|  | Content | Graphics | Linkage | Interaction | Speed | Other | None |
   |---|---|---|---|---|---|---|---|
   | Website 1 | — | — | — | — | — | — | — |
   | Website 2 | — | — | — | — | — | — | — |
   | Website 3 | — | — | — | — | — | — | — |

6. Which of the following websites do you prefer?

Website 1 —
   Website 2 —
   Website 3 —

FIG. 5E

Hello, I'm _____ from e-ValuWeb.com, a website evaluation firm. You recently participated in an Internet survey dealing with _____. You said that you would be willing to help us by answering a few follow-up questions. We will pay you $___ for your help.

1. You viewed three websites: Website 1, Website 2, and Website 3. Which of these websites did you like best?

Website 1 _
   Website 2 _
   Website 3 _

2. Why do you say that? What was there about _____ that made you prefer this website over the others?

Any other reasons?

We would like to ask some follow-up questions about one of these websites, Website 2. [the website being evaluated]

1. What did you like best about Website 2? What other good features did it have? In what ways was it better than the other websites?
2. What did you dislike most about Website 2? What other features did you dislike? In what ways was this site not as good as the other websites?
3. How could Website 2 be improved or made better? What other changes could be made? (Alternative question: IF you could give the people who designed Website 2 some advice, what would you tell them? What other advice would you give?)
   3A. How could they improve what was said?
   3B. How could they improve how it looks?
   3C. How could they make it easier to use?
   3D. Of the changes you suggested, which one or ones are most important?
4. What else would you say to the people who designed Website 2 that would help them do an even better job of designing the websites?
5. When you first viewed Website 2, what was your first reaction? What went through your mind? What other thoughts and feelings did you have?

FIG. 5F e-ValueWeb
*Leaders in Web Site Evaluation*

You are taking a survey.
The operation you are trying to do is not allowed.
Please hit the back button in your browser to continue the survey.

FIG. 7

Respondent No: 0237  
Total Time: 0:01:00.0

| URL | TOP-LEFT PIXEL | WINDOW SIZE | TIME |
|---|---|---|---|
| http://www.researchsite.com/index.htm | 0000,0000 | 700,550 | 0:00:15.0 |
| http://www.researchsite.com/index.htm | 0020,0000 | 700,550 | 0:00:00.5 |
| http://www.researchsite.com/index.htm | 0035,0000 | 700,550 | 0:00:00.6 |
| http://www.researchsite.com/index.htm | 0056,0000 | 700,550 | 0:00:12.5 |
| http://www.researchsite.com/index.htm | 0079,0000 | 700,550 | 0:00:00.4 |
| http://www.researchsite.com/index.htm | 0098,0000 | 700,550 | 0:00:00.6 |
| http://www.researchsite.com/index.htm | 0132,0000 | 700,550 | 0:00:00.4 |
| http://www.researchsite.com/index.htm | 0135,0000 | 700,550 | 0:00:05.5 |
| http://www.researchsite.com/topic1.htm | 0000,0000 | 700,550 | 0:00:08.0 |
| http://www.researchsite.com/topic1.htm | 0077,0000 | 700,550 | 0:00:00.5 |
| http://www.researchsite.com/topic1.htm | 0158,0000 | 700,550 | 0:00:03.5 |
| http://www.researchsite.com/moreinfo.htm | 0000,0000 | 700,550 | 0:00:06.0 |
| http://www.researchsite.com/moreinfo.htm | 0020,0000 | 700,550 | 0:00:00.5 |
| http://www.researchsite.com/moreinfo.htm | 0037,0000 | 700,550 | 0:00:00.5 |
| http://www.researchsite.com/moreinfo.htm | 0059,0000 | 700,550 | 0:00:00.5 |
| http://www.researchsite.com/moreinfo.htm | 0082,0000 | 700,550 | 0:00:05.0 |

FIG. 8

| | |
|---|---|
| From: | e-ValueWeb.com |
| To: | Potential Respondent <name@email.com> |
| Subject: | COLLECT $20.00 FOR YOUR OPINIONS |
| Date: | Thu, 19 Oct 2000, 07:08:46-0500 | e-ValuWeb.com e-ValuWeb.com is currently conducting an on-line research study and would like to GET YOUR OPINIONS. There are absolutely NO SALES INVOLVED! The results will be used FOR RESEARCH PURPOSES ONLY.

The 15-20 minute study is about (insert subject here) and includes your personal analysis of three (subject)-related Web Sites. The FIRST FIFTY (50) people to FINISH the survey will receive a CHECK FOR $20.00.

If you are interested, please go to http://www.e-ValuWeb.com. Please use the following login and password:

Login:     A100
        Password: t1017

After you have completed the survey, please make sure to fill out the NAME AND ADDRESS section COMPLETELY so we can mail you your CHECK FOR $20.00, if you qualify. Please allow 7 to 10 days for receipt of your payment.

Thank you for joining us, e-ValuWeb.com

If you have any comments or questions, please contact us at service@e-ValuWeb.com. Your inquiries will be handled by a REAL PERSON. If you wish to be excluded or removed from future mailings please reply to this email and type the word REMOVE in the subject area.

FIG. 9

METHOD AND SYSTEM FOR DETERMINING THE EFFECTIVENESS OF A STIMULUS

STATEMENT OF COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Field of the Invention

The present invention relates to evaluation of stimuli. More specifically, the invention is a method and system for determining the effectiveness of stimuli using the Internet for evaluating stimuli and their effect on respondents.

2. Background of the Invention

Various methods for determining the effectiveness of a stimulus, such as an advertisement or a pictorial display, are well known in the art. For instance, researchers often conduct non-computerized studies on the effectiveness of a stimulus, usually in an academic, non-profit, government, commercial environment, or the like. A researcher will assemble a pool of respondents who they will then ask to view a stimulus. For this example, assume the stimulus is a print advertisement. Each respondent, in isolation except for optionally the researcher, will view the stimulus. The researcher will then ask each respondent what he or she liked, disliked, etc. regarding the stimulus. These questions are generally referred to as attitudinal questions. They will often continue by asking the respondent whether he/she is more or less likely to purchase the goods or use the services advertised as a result of viewing and/or interacting with the stimulus. These questions are generally referred to as behavioral questions. Other attitudinal and behavioral measures include what characteristics of the goods and services are important/unimportant, the potential purchase frequency of the goods or services and the relative preference versus competing goods or services. At some point in the research process the researcher will ask the respondent classification questions to determine in which demographic the respondent belongs. Classification questions include questions relating to age, gender, income, marital status, parental status, job type, and the like.

Non-computerized research is extremely time consuming and requires extensive resources such as research personnel, physical space to conduct the research, respondent pools, and requires that the respondents physically travel to the research location. Also, this method of research does not allow a researcher to understand the interaction of a respondent with a stimulus and the stimulus' relationship to their attitudinal, usage, and classification responses.

Researchers in this manner evaluate many different types of stimulus, including print advertisements, television advertisements, radio advertisements, photopictorial displays, physical designs of consumer goods, movie trailers, television programs, editorial contents, book jackets, clothing designs, automobile designs, and the like. However, researchers could not evaluate these stimuli based on the precise portion of the stimulus at which the respondents were looking. Later developed were systems to track eye movement that attempted to measure which portion of a stimulus was being viewed. However, there was a bias inherent in these systems that detracted from their accuracy to such a degree that researchers often would not use them because these systems would contaminate the rest of the researcher's data.

With the advent of computers, researchers began executing research by programming computers to ask the respondents a variety of research questions, including attitudinal, usage, and classification questions. Computers made research interviewing more efficient and more effective. The computer programs written would automatically record the respondents' responses for analysis at a later time. While this was an improvement, large amounts of resources were still required. That is, candidates still were required to travel to the research location, physical space must still be provided for the research to occur, computers must be supplied for the candidates' use, and there must still be a large pool of candidates willing to partake in the research. In addition, the researchers were still not able to compare how a respondent responds with how they act in observing the stimulus.

In the above examples, candidates are often drawn from the student body of a university, or advertisements are dispersed in search of respondent candidates in a local geographic area. Both of these techniques limit the respondent pool to either a predetermined group of individuals or individuals located within a limited geographic area.

With the advent of the Internet, researchers became able to show stimuli to and get responses from respondents in a non-personally interactive way. Researchers, and professional research companies, began developing websites through which research was undertaken. That is, respondents visit the website, view the stimulus on the website, and respond to questions regarding the stimulus on the website. An example of such a website is www.greenfield.com. There was also the development of specialized software that tracked a respondent's navigation throughout a website by recording the hyperlinks on which a respondent clicked and in what order the respondent clicked on each of them. Also recorded is the amount of time between hyperlink clicks. In this manner, researchers and proprietors of websites can determine which pages of a website are viewed most often and for how long each was viewed. However, the present methods of tracking do not allow a researcher to determine which portions of a web page are viewed when the web page size is greater than the browser window's height or width. That is, researchers cannot measure what the respondents are specifically looking at within a web page.

In similar fashion, software has also been developed that monitors when a respondent clicks on a banner advertisement on a website, and monitors any subsequent transactions with the advertised company. That is, it is recorded whether the respondent purchased goods from the advertised company or not. However, in using these types of systems, while researchers are able to draw from a larger respondent pool, the research is still limited in that the respondents are studied in an environment where there is no understanding of actual stimulus viewing and the relationship of stimulus viewing on attitudinal, usage, and classification measurements. In the above examples, it is not possible to accurately compare how a respondent answers research questions with how the respondent behaves while interacting with a stimulus.

SUMMARY OF THE INVENTION

The present invention is a method and system of evaluating a stimulus and the effect of the stimulus on a respondent using a computer network such as the Internet. The invention can be used to more effectively evaluate any stimulus that may be presented via a personal computer connected to a network.

The invention asks a respondent attitudinal and/or behavioral questions, then monitors a respondent's behavior while viewing a stimulus. In one embodiment, the stimulus is stored on the research taker's server. The stimulus can be any type of stimulus that can be stored on and presented using conventional personal computers. The system monitors the respondent's behavior through use of a computer program associated with a web page used to display the stimulus.

In another embodiment of the invention, the stimulus is a website stored on an independent website host's server. The research server acts as a proxy server, filtering the web page information on the fly by rebuilding hyperlinks, canceling 'post' operations, and associating program code with the filtered web page to enable the system to monitor the respondent's behavior. The system monitors and records the hyperlinks on which the respondent clicks, the amount of time between hyperlink clicks, and the portion of the web page the respondent is specifically looking at by recording in one-half second intervals the coordinate of the pixel in the top left corner of the viewable area of the browser window and the size of the viewable area of the browser window.

In one embodiment, the system invites a respondent to participate in the research study, presents usage questions to the respondent, stores answers to the usage questions in the computer memory, presents a first stimulus to the respondent, measures the stimulus reception and processing data, optionally presents one or more additional stimuli, measuring reception and processing data for each one, presents a first set of attitudinal questions to the respondent, stores answers to the first set of attitudinal questions in the memory of the computer, re-presents at least one stimulus to the respondent, measures stimulus perception and processing data, presents a second set of attitudinal questions to the respondent, stores answers to the second set of attitudinal questions in the computer memory, presents third set of attitudinal questions to the respondent to measure delayed impact, store answers to the third set of attitudinal questions in the computer memory, optionally performs a telephone interview with the respondent, stores answers from the telephone interview in the computer memory, collects and integrates the results database, analyzes the database, provides a score as an indication of at least one stimulus from the research study, and provides substantive feedback to the stimulus owner.

BRIEF DESCRIPTION OF THE DRAWINGS

FIGS. 5A–5F are questions used in the invention.

FIG. 7 is a sample error page.

FIG. 8 is sample output produced through the inventive system and method.

FIG. 9 is a sample invitational email.

DETAILED DESCRIPTION

The present invention is a method and system of analyzing a stimulus and its effect on a respondent using a computer network such as the Internet. The invention can be used with respect to any stimulus that may be presented via a personal computer connected to the network. Types of stimuli that may be analyzed include visual stimuli such as photographs, print advertisements and banner advertisements for websites, audio stimuli such as radio advertisements, jingles, and sound effects, and multimedia stimuli such as Internet websites, application software, games, television advertisements, movie trailers, and the like. The invention may be used to aid in making marketing decisions, advertising decisions, political decisions, and the like. Any stimulus that is capable of being presented over a computer network may be analyzed such that a researcher can understand a respondent's reaction to the stimulus and relate the reaction to attitudinal, behavioral, and classification measures.

The invention provides a method and system for more accurately measuring the effectiveness of a stimulus, as well as the effect a stimulus produces in a respondent, using a global computer network such as the Internet.

Figure 1:
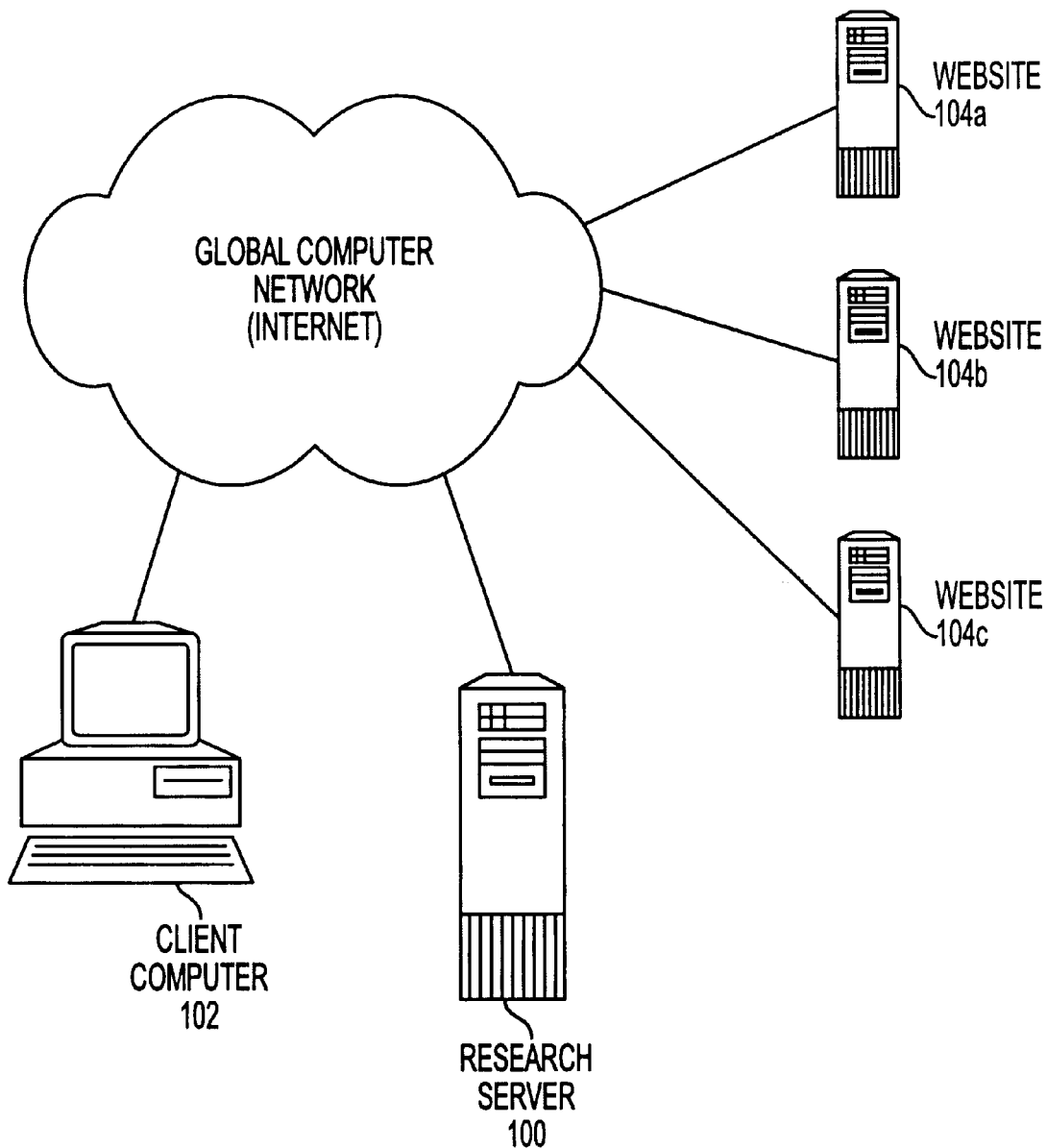
FIG. 1 depicts computers connected via a network for use in the present invention.

The invention will now be described with reference to the figures. FIG. 1 displays computers connected via a network for the inventive method and system. A research server 100, at least one client computer 102, and optional external website servers 104 are connected via a global computer information network, such as the Internet. For purposes of this specification, when a respondent downloads .html, .xml, asp or like pages from a website server 104, the respondent is said to 'visit' the website by viewing the information downloaded from the website server to the respondent's computer 102 using an Internet browser such as Microsoft® Internet Explorer®, Netscape® Navigator®, or the like.

In one embodiment, the stimuli to be analyzed are stored on the research server 100. For purposes of example only, in this embodiment, the stimuli are photographs stored in a known graphical format, such as .jpg, .gif, or .tiff. The website servers 104 are external Internet website service providers, not used in this embodiment. The research server 100 is a computer adapted as a web server and contains a memory 200. The memory 200 contains website data 202, which includes web page source files, such as .html, .asp files and the like, that contain and present information regarding the research study to respondents participating in the study. The memory also contains the web server program 204, optional stimulus data 206, the research data 208, application programs 210, and research results 212. The stimulus data 206 may include graphics files to store visual stimuli, sound files to store audio stimuli, or multimedia files to store multimedia stimuli. The results data 212 is stored on the server 100 as a result of respondents' participation in the research study, as indicated below. In this example the stimulus data 206 is the photographs in graphical file format.

Figure 2:
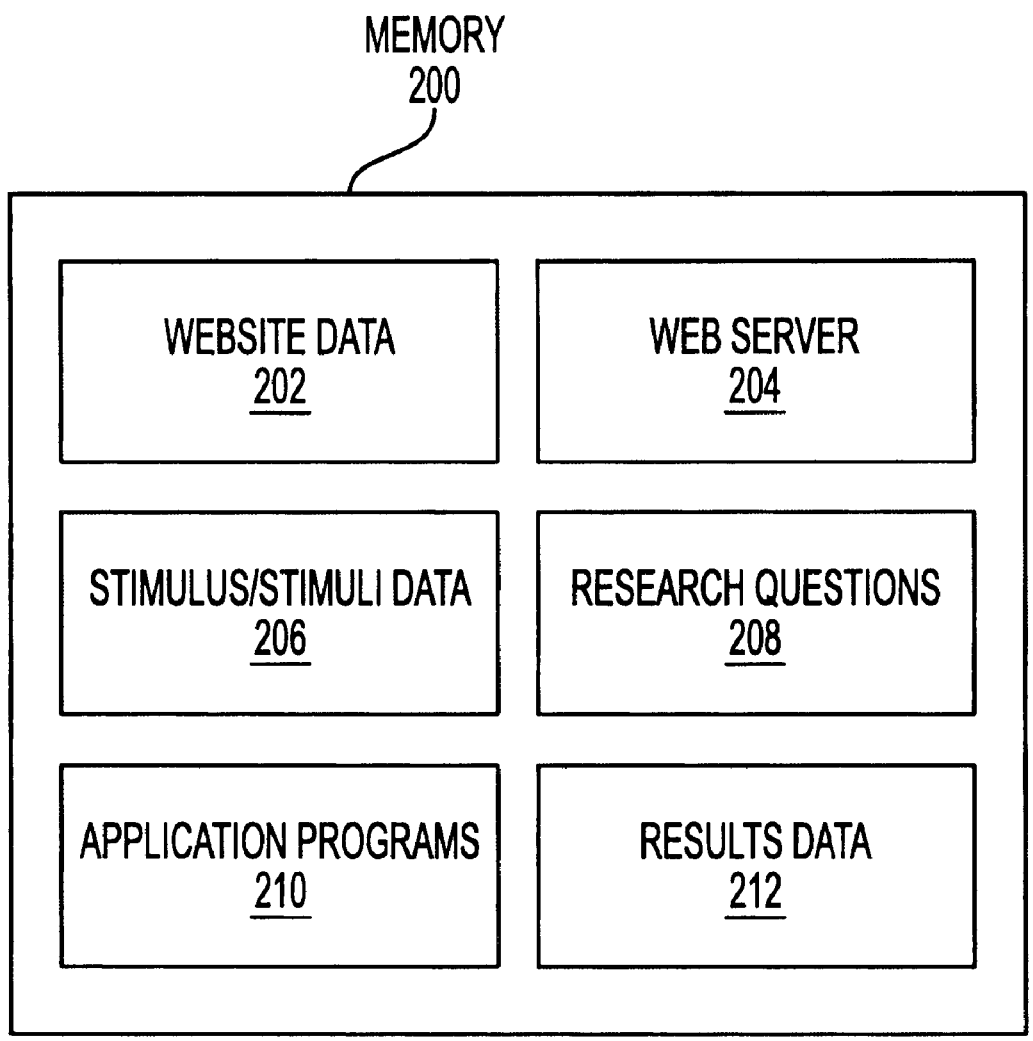
FIG. 2 is a computer adapted to perform the present invention.
Figure 3:
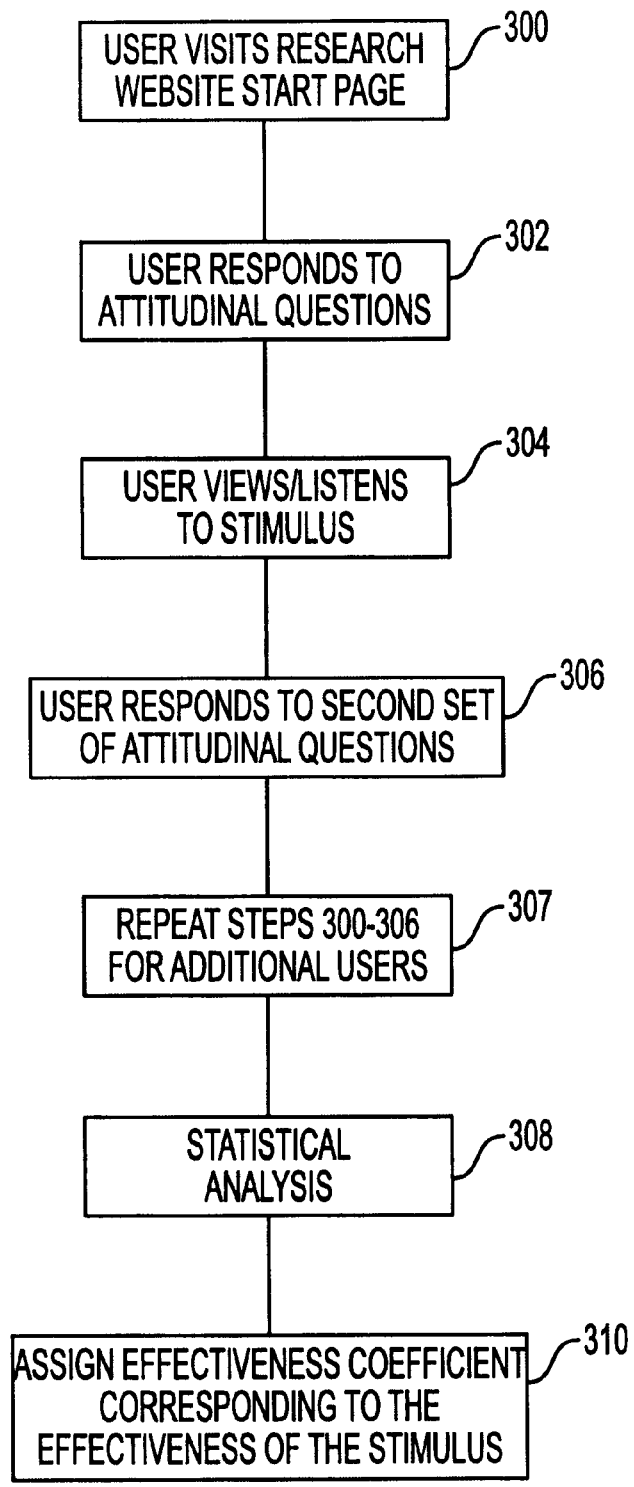
FIG. 3 is a flowchart of one embodiment of the invention.

The inventive method will now be explained with reference to FIGS. 2–3. In step 300, a respondent visits a research website start page stored in memory 200 of the research server. The web page gives the respondent basic information regarding the background of the research project such as what the respondent will be viewing, what is expected of the respondent, how much time the research should take, and other relevant information to the respondent. The respondent, via the website on the same or a different web page, is optionally asked usage questions regarding the respondent's predisposition to the subject matter of the study in step 302. The usage questions are stored in the memory 208 of the research server.

In step 304 the respondent receives the stimulus 206 via the same or another web page stored on the research server 100. By receiving the stimulus, it is meant that the respondent views the visual stimulus, listens to the audio stimulus, or both in the case of a multimedia stimulus. In this example, the respondent views the photographs stored in graphical file format as a web page using an Internet browser program. After the respondent is finished watching and/or listening to the stimulus, the respondent proceeds to answer a set of attitudinal questions regarding the stimulus, or the goods or services advertised by the stimulus, in step 306. The attitudinal questions are stored in a portion 208 of the memory 200.

Steps 300–306 are repeated multiple times by a plurality of respondents to gather additional data regarding the stimulus. Generally about one hundred to five hundred respondents participate in each research study. However, it is possible that more respondents or fewer respondents could participate, depending on the research study. After a useful amount of data has been collected, the data is statistically processed in step 308. Based on the statistical analysis, as well as other factors, a score is assigned to the stimulus regarding its effectiveness in step 310.

Figure 4:
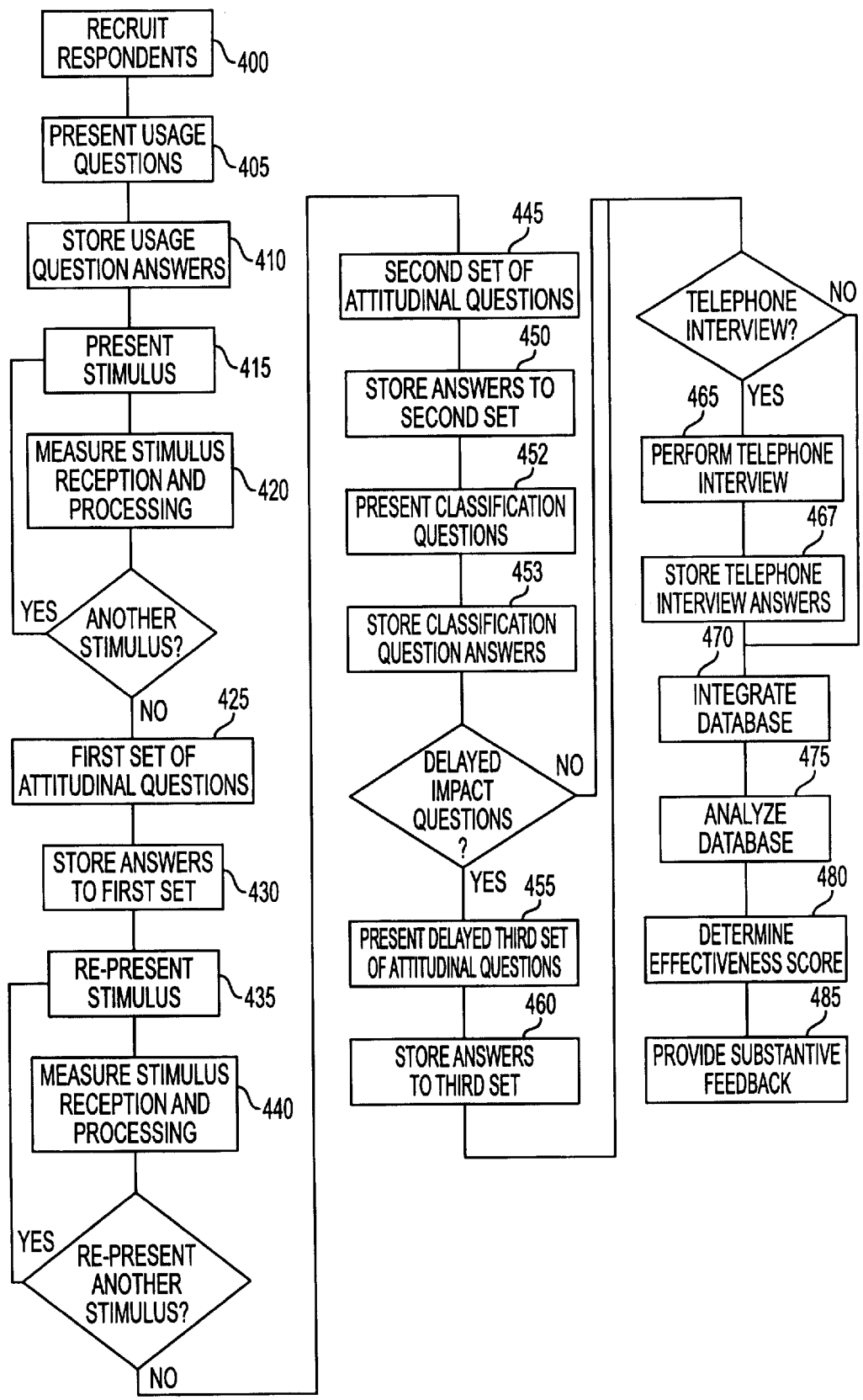
FIG. 4 is a flowchart of a second embodiment of the invention.

In another embodiment of the invention the stimulus being evaluated is an Internet website hosted by one of the website servers 104. The method of the present embodiment is described with reference to FIG. 4. In step 400 a potential respondent is recruited by sending an invitational email, including information necessary for the respondent to participate in the research study. The email, such as one shown in FIG. 9, includes information such as a login code and password, the URL of the website to at which the respondent participates in the study, and informative material regarding the research. The respondent then visits the URL on the research server 100, and logs into the research server using the supplied login code and password.

In step 405 the respondent is presented with information regarding the study and is presented with usage questions such as those in FIG. 5A. Usage questions, generally, are questions relating to a respondent's previous experience using and/or interacting with the stimulus/stimuli being evaluated. After answering the usage questions, the system stores the results 212 in the server memory 200 in step 410. The respondent is then prompted to visit a first independent website 104a in step 415.

Figure 6:
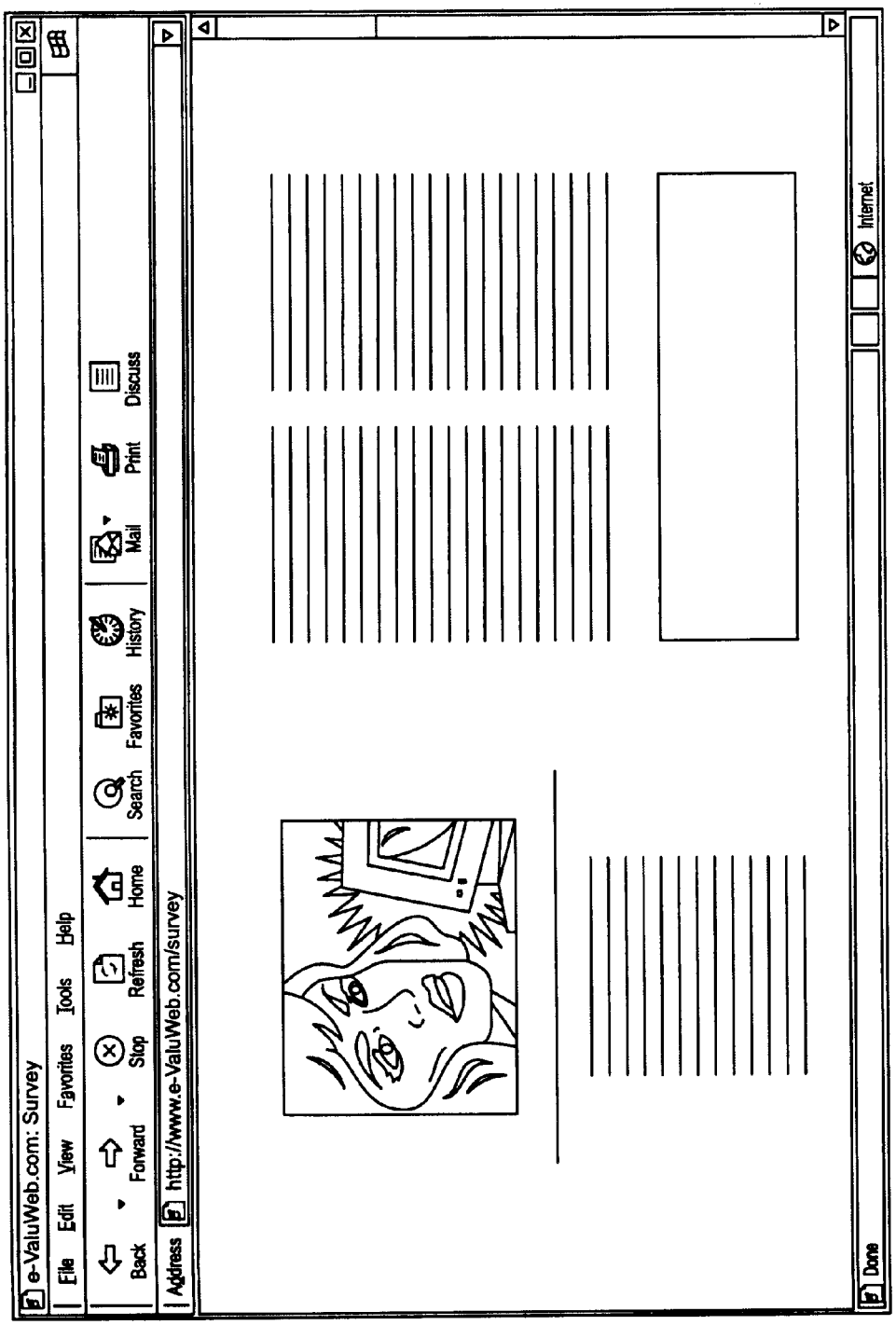
FIG. 6 is a sample stimulus website.

Upon determining that the respondent is ready to begin visiting the independent website, the system retrieves the independent website information from website server 104a. The server 100 acts as a proxy server to the respondent viewing the website, transforming the independent website information on the fly into research compatible format. Research compatible format is achieved by first amending all hyperlinks to be redirected through the research server as a proxy server. The system also removes any 'post' operations in the .html code. Finally, the system transforms the web page into a framed page, wherein the original page consumes all but one pixel width and/or height of the browser window, and the system inserts a 'Done' button overlaying the page in a corner of the window. FIG. 6 depicts a stimulus website with the 'Done' button in the lower right corner of the browser window's viewable area. In one embodiment, this button remains in the corner regardless of whether the respondent scrolls up or down or left or right on the web page. With the one pixel height portion of the frame is associated program code written in JavaScript, or other suitable programming language, that monitors the respondent while viewing the web page. The JavaScript code monitors the respondent by recording specified variables in one-half second intervals and sending the results to the research server. Two common variables available in web browsers include the coordinate of the pixel in the top left corner of the browser window, and the current pixel size of the browser window. The system records these two variables every one-half second to determine which specific portions of the web page the respondent is viewing and for how long. In this manner, the system can monitor exactly what the respondent is looking at when the web page consumes more than one window length or width in size. Also, in the photo example above, where the photo cannot be fully displayed in one viewable portion of a browser window, this method and system can determine which portions of the photograph research participants viewed most, and for how long.

When the respondent clicks on a hyperlink in order to view another web page, the system retrieves the requested page from the independent website server, transforms it as described above, and serves it to the respondent for browsing. The system also records the hyperlink the respondent clicked on to request the page and the time interval since the previous page request. In this manner the system can monitor which pages the respondent views and for how long the respondent views them. If the respondent clicks on a hyperlink that initiates a 'post' operation, the system informs the respondent that the 'post' operation is currently disabled, and allows the respondent to continue browsing other aspects of the website, as shown in FIG. 7.

While the respondent is visiting the website, the system monitors the respondent's movement throughout the website in step 420 as described above and stores the collected data in a data file 212 on the research server 100. When the respondent is finished visiting the website, the respondent informs the research server that s/he is finished visiting the website by clicking the overlaid 'Done' button in the corner of the current web page. This causes the system to close the browser window containing the independent website presently being viewed by the candidate. Steps 415–420 may be repeated any number of times so that the respondent can visit and the system can collect data regarding multiple websites. This allows the system to compare data from one website against data from another website.

FIG. 8 shows sample data gathered while a respondent is viewing a website. FIG. 8 shows the URL visited with the specific viewable portion and the duration. FIG. 8 shows that the respondent viewed the website for a total of one minute. The respondent initially viewed the default portion of the website's home page for fifteen seconds. This is shown by the pixel in the top left corner of the display window (0000,0000) being the pixel in the top-left corner of the web page. The default portion of a web page is the portion first displayed in a web browser when a web page is loaded. The respondent's window display size is 700 pixels by 550 pixels. Using this data, a researcher knows that the respondent initially viewed the top 550 pixels and the left-most 700 pixels for fifteen seconds. FIG. 8 further shows that the user slowly scrolled down until the top-left pixel in the display window was pixel 0056,0000, where the respondent paused for 12.5 seconds. The researcher knows that the respondent viewed the leftmost 700 pixels in the vertical range 0056 to 0606 for 12.5 seconds. The respondent then continued scrolling down, stopping when the top-left pixel was 0135, 0000. After reading or viewing that portion of the web page for 5.5 seconds, the respondent clicked on a hyperlink to the URL http://www.researchsite.com/topicl.htm, where the user viewed the default portion of that web page for 8 seconds before scrolling down. After scrolling down, the user viewed a portion of the web page for 3.5 seconds before clicking on a hyperlink to the URL http:// www.researchsite.com/moreinfo.htm. Similar detail is shown for the respondent's viewing of the web page http://www.researchsite.com/moreinfo.htm.

Using the information in FIG. 8, a researcher can determine an amount of time each respondent viewed each web page, each portion of the web page, and a total time spent viewing the entire web site. The researcher also knows the specific portions of each web page that were viewed and for how long, as well as the specific path that the respondent followed while visiting the website. The data in FIG. 8 is presented in a user-friendly format. The research server receives data in one-half second intervals including the URL, the top-left pixel, and the window display size. The total time per portion of the web page is then calculated based on the number of consecutive one-half second reports received with respect to the same portion of a web page.

After the respondent informs the research server that the respondent is done, and there being no more remaining websites for the respondent to visit, the research server prompts the respondent via a web page to answer a first set of attitudinal questions stored in a portion 208 of memory 200 regarding the visited website in step 425. A set of attitudinal questions is shown in FIG. 5B. The answers to the first set of attitudinal questions are stored in a portion 212 of the computer memory 200 in step 430.

Upon completion of the first set of attitudinal questions, the respondent is again presented with at least one website stimulus in step 435. That is, the respondent is again asked to visit at least one website. In step 440, the system again monitors and records the respondent's movement and usage of the website as described above. The respondent again clicks on an overlaid 'done' button to indicate to the system that the respondent has finished visiting the stimulus website. Next, in step 445, the respondent is presented with a second set of attitudinal questions regarding at least the stimulus most recently visited. A second set of attitudinal questions is shown in FIG. 5C. The answers to the second set of attitudinal questions are stored in a portion 212 of the memory 200 in step 450. Finally, the respondent is presented with a set of classification questions instep 452. A set of classification questions is shown in FIG. 5D. The system stores the answers to the classifications in a portion 212 of the memory 200 in step 453.

In another embodiment of the invention, at least one respondent is presented with a third set of attitudinal questions to test for the delayed impact of the stimuli. That is, the respondent is asked to return to the research website at a later time, generally the next day, and is presented with a third set of attitudinal questions, in step 455, regarding the stimuli presented during the research study. A delayed impact third set of attitudinal questions is shown in FIG. 5E. The delayed impact research may be accomplished by sending the respondent an email with a an embedded hyperlink on which the respondent can click to visit a web page on the research server that contains a third set of attitudinal questions. The answers to the delayed impact attitudinal questions are stored in a portion 212 of the memory 200 of the research server in step 460.

In another embodiment of the invention, at least one respondent is interviewed, via telephone or other form of audio communication, in step 465. Answers from the telephone interview are stored in a portion 212 of the memory 200 in step 467. A set of telephone interview questions is shown in FIG. 5F.

Steps 400–465 are then repeated for a plurality of respondents such that enough data is gathered so that data from the various website stimuli can be compared to determine strengths and weaknesses of each stimulus. Generally between 100 and 500 respondents participate in a research study. However, it is possible to use a lesser or greater amount of participants, depending on the level of accuracy desired, time constraints, manpower constraints, etc. It is possible that the number of respondents is greater than 10,000, or even 100,000.

After all participants have finished visiting the websites in the research study, the system integrates the collected data in a single database in step 470. The system analyzes the data in step 475. The analysis first includes separate statistical analysis of the collected responses from the plurality of respondents and the monitoring data collected on the research server. The data is then combined and correlated. This combined data correlation is important in that the effectiveness of a web site is better represented and understood by a unique weighted combination of measurements that reflect those portions of the web site that respondents have viewed and for how long, correlated with the responses to pertinent attitude and usage questions. It is the optimal combination of survey question responses and web site monitoring that leads to the calculation of an effectiveness coefficient in step 480. In step 480, the system assigns a score to the website, based on the analysis in step 475, as an indication of the website's effectiveness as a stimulus. The effectiveness coefficient is derived from known methods of statistical analysis performed on the data received from the respondents' surveys in combination with the data collected while monitoring each respondent's interaction with each stimulus. Based on the analyzed results and the effectiveness coefficient assigned to the website, the researcher provides substantive recommendations to the stimulus owner regarding the stimulus' strengths and weaknesses, as well as regarding the effect the stimulus produced in the respondents.

While the method of the invention has been described with respect to a preferred embodiment, it is possible that steps of the above-described method may be rearranged and still engage the spirit of the invention. For instance, the telephone interview could be conducted before the respondent is presented with the delayed third set of attitudinal questions, or the classification questions could be presented early in the method, rather than near the end of the method.

Using the invention as described above, a researcher can relate respondents' visits to websites or other stimuli with attitudinal measures to predict future behavior. The invention allows a researcher to compare how a respondent responds to research questions with how the respondent actually behaved in the research study by tracking information such as which portions of the stimulus the respondent specifically looks at and for how long. The respondent cannot respond in one manner to the attitudinal questions and behave in another manner while viewing the stimulus without the researcher being aware that the respondent is doing so. The present invention is a more accurate method and system for evaluating stimulus.

In one embodiment, the invention described herein can be used to evaluate a website as compared to the website's competitors. The invention would use multiple websites as stimuli, monitoring a respondent's interaction with each one. It is apparent in this regard that the invention can be used to analyze a website against competitor's websites to determine its strengths and weaknesses as well as market appeal to consumers. It should also be apparent that the invention can be used to determined the effect of a stimulus on one or more respondents, as well as to compare the effect of two or more stimuli on a group of respondents.

It is also possible, using the inventive method and system as described above, to evaluate the effect of a stimulus on a respondent or a group of respondents. In one embodiment the invention is used to evaluate respondents reactions to hair color. The invention is performed with respect to FIG. 4, as described above. The stimuli presented in steps 415, 435 are two or more websites that differ only with respect to a single, or limited amount, of photographs. The text and other content of the websites are substantially identical. In the first website, shown in FIG. 6, the photograph depicts a person with dark black hair. In a second website, everything else remaining substantially identical, the photograph depicts a person with light hair. By measuring the respondents' interaction with the two websites using the method and system described above, a researcher can determine whether the respondents prefer dark hair to light hair or vice versa. By including additional websites with photographs depicting persons of other hair colors, such as red, different information is obtained.

In another embodiment of the invention, political stimuli are presented to the respondents. That is, the stimuli are two or more political websites that are evaluated against each other, and the respondents recruited for participation are undecided voters. By way of example, if the researcher wants to determine which political message is more appealing to a group of undecided voters, the researcher can prepare the two websites to be substantially identical with the exception of one instance of a candidate's political position on an issue. If more instances are varied from one website to the other the results are less accurate. The invention then is performed as described above with reference to FIG. 4. By monitoring which portions of the website the respondents viewed and for how long, it can be determined which of the candidate's political positions on an issue is more appealing to undecided voters.

While the invention has been described in specific embodiments, it should be apparent to one skilled in the art that programming languages other than JavaScript and different browser software may be applied to achieve the same results.

It should be appreciated by those skilled in the art that modifications may be made, or various methods or systems may be used, which are within the scope and spirit of the present invention as defined in the appended claims.

What is claimed is:

1. A method for evaluating the effectiveness of a stimulus, comprising the steps of:
   a) presenting an interactive stimulus to a respondent using a data processing device;
   b) as the user interacts with the stimulus, monitoring and recording interaction data comprising a pixel coordinate and a size of a stimulus display area;
   c) presenting to the respondent a first set of attitudinal questions relating to the presented stimulus;
   d) recording answers from the first set of attitudinal questions;
   e) repeating steps a)–d) for a plurality of respondents representative of a target group of people to which the stimulus is directed; and
   f) determining a stimulus effectiveness measure based at least in part on the recorded answers and the interaction data.

2. The method of claim 1, wherein step b) comprises recording interaction data in predetermined intervals of time.

3. The method of claim 1, wherein, in step a), the interactive stimulus comprises a web page.

4. The method of claim 3, wherein, in step a), the interactive stimulus comprises a web site.

5. The method of claim 4, wherein, in step b), the interaction data comprises clickstream information.

6. The method of claim 1, further comprising the steps of:
   g) asking the respondent a second, delayed set of attitudinal questions, wherein the delay is at least one hour; and
   h) recording answers to the delayed second set of attitudinal questions,
   wherein the effectiveness measure is further based at least in part on the recorded answers to the delayed second set of attitudinal questions.

7. The method of claim 1, further comprising the steps of:
   g) personally interviewing the respondent; and
   h) recording answers to questions asked during the personal interview,
   wherein the effectiveness measure is further based at least in part on the recorded answers from the personal interview.

8. The method of claim 7, wherein, in step g), the interview is conducted via telephone.

9. The method of claim 1, wherein step f) comprises statistically analyzing the answers recorded in step d) in combination with the interaction data recorded during step b).

10. The method of claim 1, wherein, in step f), the effectiveness measure comprises a score indicative of the stimulus' effectiveness.

11. A computer readable medium storing computer readable instructions that, when executed by one or more processors, cause one or more data processing devices to perform a method for evaluating the effectiveness of a stimulus, comprising the steps of:
   a) presenting an interactive stimulus to a respondent using a data processing device;
   b) as the user interacts with the stimulus, monitoring and recording interaction data comprising a pixel coordinate and a size of a stimulus display area;
   c) presenting to the respondent a first set of attitudinal questions relating to the presented stimulus;
   d) recording answers from the first set of attitudinal questions;
   e) repeating steps a)–d) for a plurality of respondents representative of a target group of people to which the stimulus is directed; and
   f) determining a stimulus effectiveness measure based at least in part on the recorded answers and the interaction data.

12. The computer readable medium of claim 11, wherein step b) comprises recording interaction data in predetermined intervals of time.

13. The computer readable medium of claim 11, wherein, in step a), the interactive stimulus comprises a web page.

14. The computer readable medium of claim 13, wherein, in step a), the interactive stimulus comprises a web site.

15. The computer readable medium of claim 14, wherein, in step b), the data comprises clickstream information.

16. The computer readable medium of claim 11, wherein the computer readable instruction further comprise the steps of:
   g) asking each respondent a second, delayed set of attitudinal questions, wherein the delay is at least one hour; and
   h) recording answers to the delayed second set of attitudinal questions, wherein the effectiveness measure is further based at least in part on the recorded answers to the delayed second set of attitudinal questions.

17. The computer readable medium of claim 11, wherein step f) comprises statistically analyzing the answers recorded in step d) in combination with the interaction data recorded during step b).

18. The computer readable medium of claim 11, wherein, in step f), the effectiveness measure comprises a score indicative of the stimulus' effectiveness.

19. A data processing system for evaluating the effectiveness of a stimulus, comprising:

a processor, and memory for storing computer readable instructions that, when executed by the processor, cause the data processing system to perform a method for evaluating the effectiveness of a stimulus, comprising the steps of:
  a) presenting an interactive stimulus to a respondent using a data processing device display;
  b) as the user interacts with the stimulus, monitoring and recording interaction data comprising a pixel coordinate and a size of a stimulus display area;
  c) presenting to the respondent a first set of attitudinal questions relating to the presented stimulus;
  d) recording answers from the first set of attitudinal questions;
  e) repeating steps a)–d) for a plurality of respondents representative of a target group of people to which the stimulus is directed; and
  f) determining a stimulus effectiveness measure based at least in part on the recorded answers and the interaction data.

20. The data processing system of claim 19, wherein step b) comprises recording interaction data in predetermined intervals of time.

21. The data processing system of claim 19, wherein, in step a), the interactive stimulus comprises a web page.

22. The data processing system of claim 21, wherein, in step a), the interactive stimulus comprises a web site.

23. The data processing system of claim 22, wherein, in step b), the data comprises clickstream information.

24. The data processing system of claim 19, wherein the computer readable instruction further comprise the steps of:

g) asking each respondent a second, delayed set of attitudinal questions, wherein the delay is at least one hour; and h) recording answers to the delayed second set of attitudinal questions, wherein the effectiveness measure is further based at least in part on the recorded answers to the delayed second set of attitudinal questions.

25. The data processing system of claim 19, wherein step f) comprises statistically analyzing the answers recorded in step d) in combination with the interaction data recorded during step b).

26. The data processing system of claim 19, wherein, in step f), the effectiveness measure comprises a score indicative of the stimulus' effectiveness.

* * * * *